Miller & Decker.
File Cutting Machine.
Nº 23,645.   Patented Apr. 12, 1859.
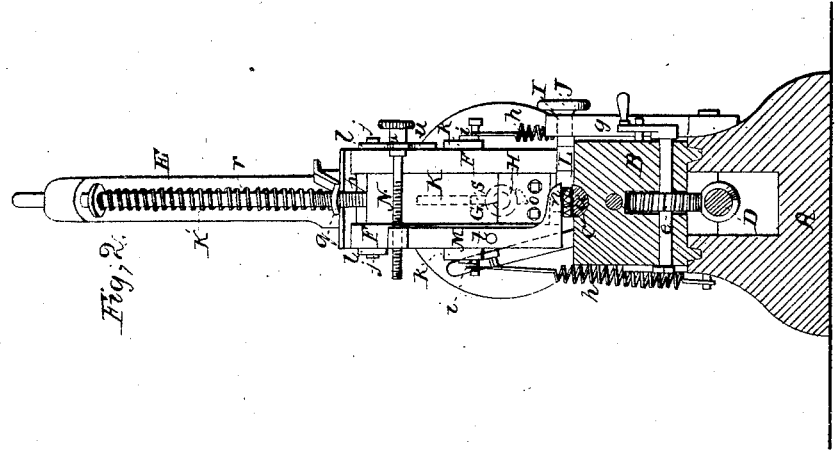
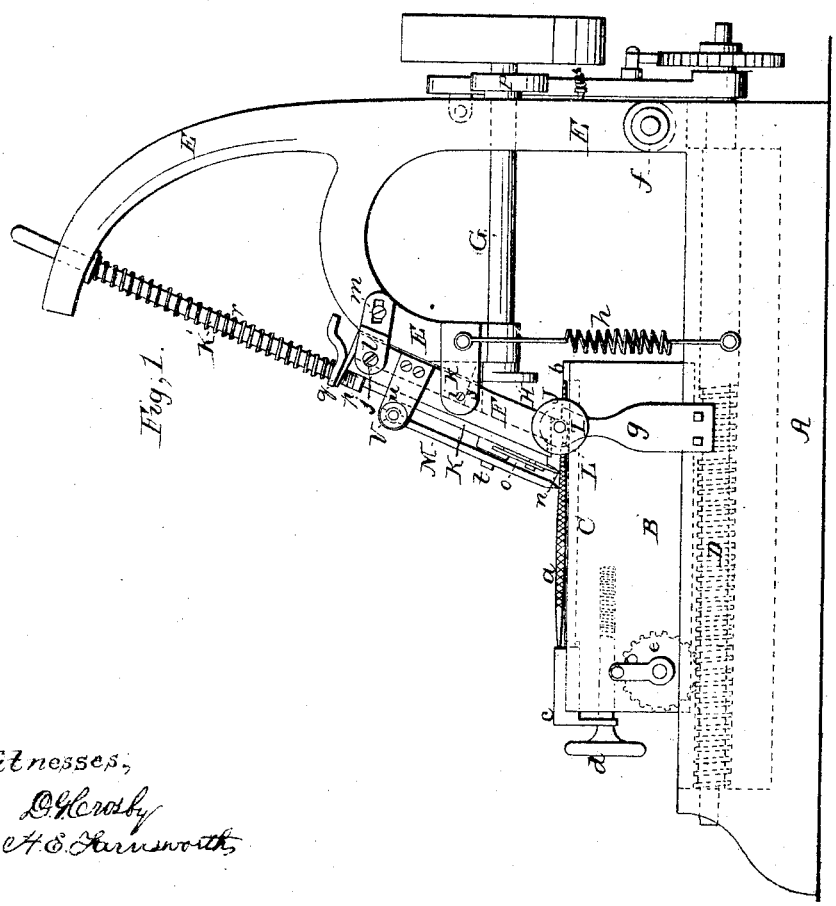
Witnesses;
D. G. Crosby
H. E. Farnsworth
Inventors;
C. Miller
Thompson W. D.

UNITED STATES PATENT OFFICE.

CHAS. MILLER AND THOMPSON W. DECKER, OF NEW YORK, N. Y., ASSIGNORS TO THOMPSON W. DECKER, OF SAME PLACE.

MACHINERY FOR CUTTING FILES.

Specification of Letters Patent No. 23,645, dated April 12, 1859.

*To all whom it may concern:*

Be it known that we, CHARLES MILLER and THOMPSON W. DECKER, both of the city, county, and State of New York, have invented certain new and useful Improvements in Machinery for Cutting Files; and we do hereby declare that the following is a full, clear, and exact description of the same, reference being had to the accompanying drawings, forming part of this specification, in which—

Figure 1, is a central longitudinal vertical section of a file-cutting machine with our improvements. Fig. 2, is a transverse vertical section of the same.

Similar letters of reference indicate like parts in both figures.

To enable others skilled in the art to make and use our invention, we will proceed to describe its construction and operation.

A, is a bedplate which supports all the working parts of the machine.

B, is a carriage fitted to slide on the said bedplate and having fitted to it a rolling or rocking bed C, such as is common to many file-cutting machines, for carrying the file-blank $a$, during the cutting operation.

$b$, $c$, are clamps and $d$, a screw for operating the clamp $c$, to secure the file-blank to the bed C.

D, is a feed screw for giving the necessary movement to the carriage B, to feed the file-blank under the chisel to make the cuts at proper distances, the said screw having journals at its ends working in bearing in the ends of the bedplate and its thread working in a gear $e$, whose journals are fitted to turn in bearings in the carriage. The said gear $e$, is locked that it may operate as a nut in connection with the screw to feed the carriage forward, and is unlocked to be operated as a pinion in combination with the screw as a fixed rack to run the carriage back quickly.

E, is the frame which contains the chisel-stock F, and all its appendages and the driving shaft G, said frame being hinged at $f$, to the back end of the bed-plate A, so as to provide for the raising of the chisel stock and chisel and all their appendages by means of a cam L, arranged below the chisel-stock, the said cam being fast upon a short shaft I, which is arranged in a bearing in the standard $g$, and which is furnished with a hand-wheel or handle J, at the side of the machine. The chisel stock is held down when in operation by means of two strong springs $h$, $h$, connecting the front portion of the frame E, close behind the chisel stock, with the bed-plate A. The chisel-stock F, which has the chisel holder K, fitted to slide freely up and down within it, is secured rigidly to the front of the frame E, partly by two screw bolts $i$, $i$, which pass through two cheek-pieces $k$, $k$, cast in the frame E, and screw into the sides of said stock, and partly by two plates $l$, $l$, which are bolted to the sides of said stock by screw bolts $j$, and to the frame E, by screw bolts $m$. The chisel holder K, having the chisel $n$, attached by means of a screw clamp $o$, has a long stem K, which passes through a guide in the top of the frame E, the lower part of which stem has a screw-thread cut upon it and passes through an opening in a plate or flange $p$, bolted to or cast on the top of stock F; and above the plate or flange $p$, the screw thread on said stem is fitted with a nut $q$, to which the plate or flange $p$, constitutes a stop for the purpose of preventing the chisel descending beyond a certain depth below the bottom of the stock F, and making a cut beyond a certain depth when driven down by a spring $r$, which is coiled round the stem K', between the nut $q$, and the top of the frame E. The holder K, has projecting from its back side an arm $s$, which is operated upon to lift the chisel holder and then to leave it suddenly to the action of the spring $r$, by means of a cam H, on the driving shaft G, the spring producing the sudden descent of the chisel which effects the cut. The driving shaft G, is driven by a belt running on its pulley G', and it carries a cam P, which operates the feed screw D, by means of a ratchet motion.

The chisel stock F, is intended to rest upon the file blank during the cutting operation and thus, by aid of the stop nut $q$, on the stem of the chisel holder, to produce a uniform depth of cut, all along the face of the file blank whatever its profile. This method of regulating the depth of cut is the same as that described in the Letters-Patent of Charles Miller, dated Novr. 11th, 1856; but instead of letting the chisel-stock itself rest directly on the face of the file-blank, as described in the before-mentioned Letters Patent, we attach to the said stock, for the purpose of supporting it on the said face, what we term the gage-rest M, the effect of which in regulating the depth of cut in the successive operations of the chisel is the same as though the chisel stock rested directly upon the file-blank, with the advantage that the said gage rest constitutes, in combination with the rolling bed C, a means of so adjusting the file blank to the edge of the chisel as to produce a uniform depth of cut all across or at both edges of either face of the file. The gage rest M, consists of a bent lever secured to the chisel stock by a fulcrum pin $t$, upon which it oscillates, and having its bottom formed with a straight edged foot-like piece which rests upon the face of the file blank. In the upper end of the said gage rest M, there is cut a female screw thread to receive a screw N, which is so fitted to a bearing $u$, attached to the stock F, as to be permitted a longitudinal movement but to be capable of being turned freely by hand to set the straight bottom edge of the foot of the gage rest parallel with the edge of the chisel. The gage rest being thus set and bearing upon the file blank with the full force due to the tension of the springs $h$, $h$, causes the rolling bed so to adapt its position as always to keep the face of the file blank parallel with the face of the chisel and thus insure the same depth of cut all across the said face. The adjustment of the blank by means of the gage rest can be effected by turning the screw N, while the machine is in operation, if it should be found that the chisel is cutting deeper toward either edge of the face.

In all other machines with which we are acquainted, whenever the chisel fails to cut evenly, it is necessary to remove the chisel and grind down its edge so that it will cut straight; this frequently has to be done very often, especially if the attendant happens to be so unlucky as to put on an untrue edge in the first setting or sharpening of the chisel; for there is no way of adjusting the bed and blank to the cutter while the machine is in operation; but the machine must be stopped and the cutter taken out and adjusted by grinding to suit the bed and blank. By arranging the gage-rest M, to oscillate as we have described, the bed and blank are adjusted at any moment desired without stopping the machine. If the attendant observes that the chisel is cutting unevenly he has only to oscillate the rest M, by turning the screw N, which will cause the foot of the rest to bear upon the desired side of the blank and bring it into line with the cutter. By arranging the rest to oscillate, we are also enabled to produce better work, because we can adjust the cutter to operate with more nicety upon all the work than it is possible to do under the method of adjusting pertaining to other machines as mentioned.

The hinging of the frame E, to the bed-plate at $f$, permits the gage rest M, to follow the curve of the face of the file and thus cause the chisel—which is always arrested by the stop $p$,—to produce a uniform depth of cut from end to end of the file, besides affording the greatest convenience for raising the chisel stock to permit the carriage to be run back and to permit the removal of the chisel.

The angle of the chisel is changed relatively to the face of the file blank by slacking the screw bolts $i$, and $m$, on each side of the machine. The latter bolts pass through slots in the plates $l$, as shown in Fig. 1, and these slots, when said bolts are slackened, permit the chisel-stock F, to swing a limited distance on the two screws $i$, $i$. When the chisel is adjusted by swinging the stock back and forth, the bolts are tightened up again and the machine is again in working order.

Having thus described our invention, we claim and desire to secure by Letters Patent,

1. Arranging the gage-rest M to oscillate upon a fulcrum $(t)$, located in relation to the cutting chisel substantially as shown, so that by moving the arm of said rest laterally by means of the screw N, the bed C, and blank $(a)$ may be adjusted to correspond with the cutting edge of the chisel, as herein set forth.

2. Hinging the frame E, which carries the chisel and its appurtenances, to the frame A, by a joint at $(f)$, so that the rest M, may readily follow the curve of the file blank, and with the chisel be thrown back when desired, all as herein shown and described.

CHARLES MILLER.
THOMPSON W. DECKER.

Witnesses:
D. G. CROSBY,
H. E. FARNSWORTH.